Dec. 28, 1948. R. KOPITA 2,457,686
GAS AND LIQUID CONTACT APPARATUS
Filed Dec. 19, 1946 2 Sheets-Sheet 1
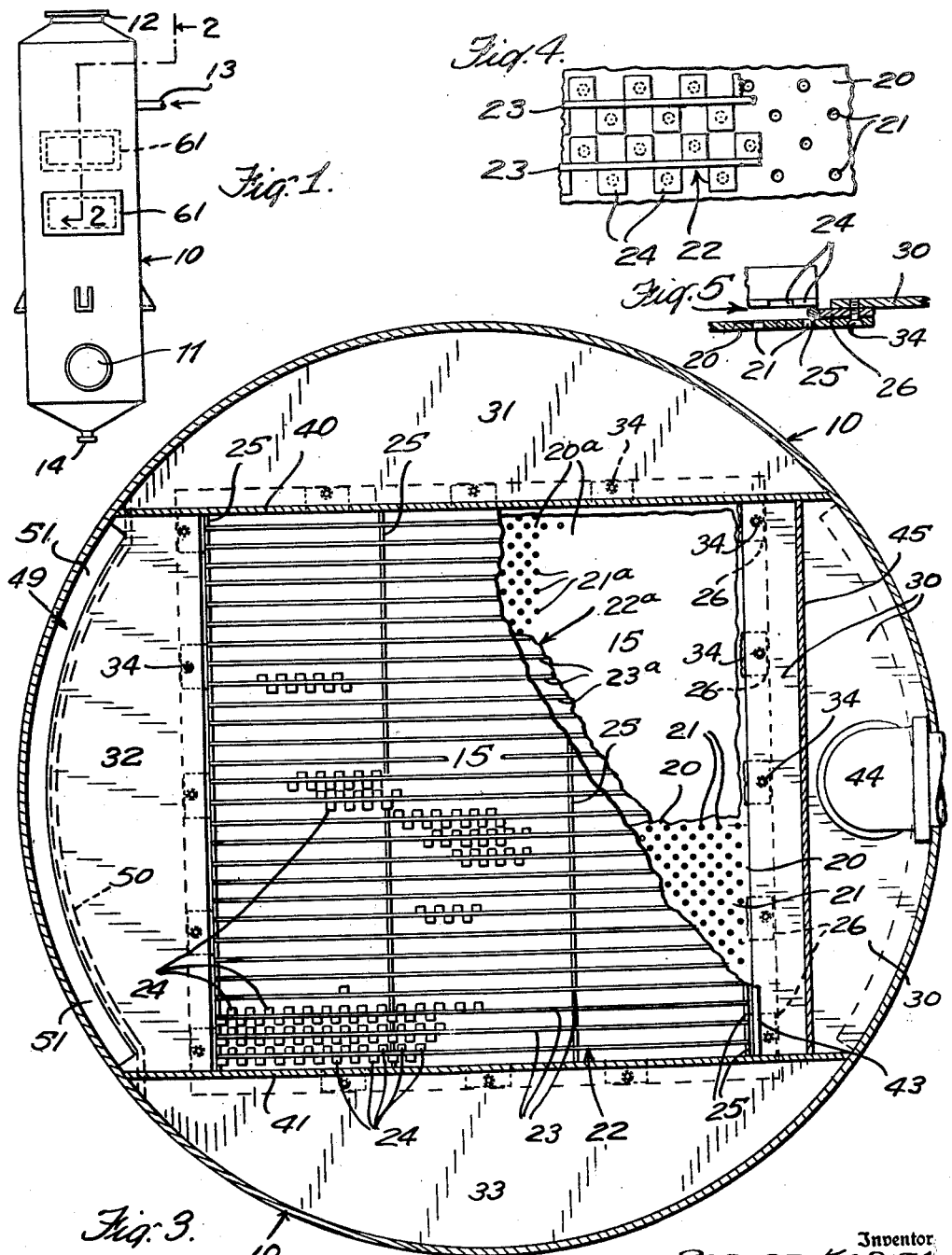
Inventor
ROBERT KOPITA
Attorney

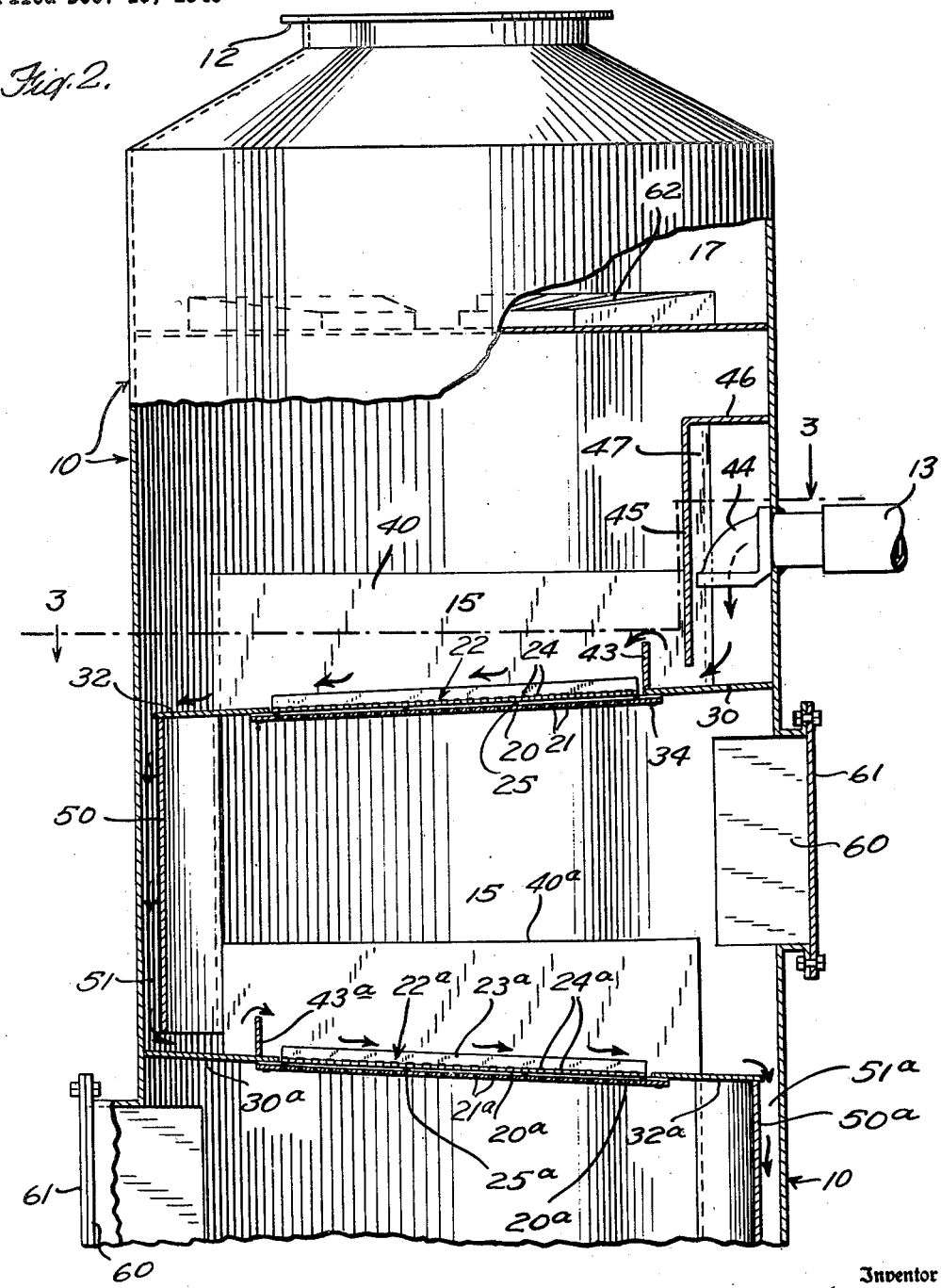

Patented Dec. 28, 1948

2,457,686

UNITED STATES PATENT OFFICE 2,457,686

GAS AND LIQUID CONTACT APPARATUS

Robert Kopita, Bound Brook, N. J., assignor to Peabody Engineering Corporation, New York, N. Y., a corporation of New York Application December 19, 1946, Serial No. 717,302

2 Claims. (Cl. 261—113)

This invention relates to gas and liquid contact apparatus of the type having one or more treating zones including perforated plates through which the gas passes upwardly at a velocity suited to prevent the liquid on said plate from passing downwardly through the perforations. Baffle grids are arranged above the perforated plates to assist in the removal of suspended particles and also to increase the time of contact between the gas and liquid. Such apparatus may be used for cleaning gases, for cooling, or for other liquid-gas contact purposes An object of the present invention is to provide an improved construction in a device of the above type wherein the gas and liquid contact efficiency is increased.

Another object is to provide a construction wherein a uniform liquid flow is obtained across the perforated plates.

Another object is to provide a novel and improved construction wherein all of the liquid is caused to flow across the plates for contact with the gas passing upwardly through the perforations therein.

Another object is to provide a novel and improved construction wherein a uniform depth of liquid is maintained over the entire plate.

Another object is to provide a novel and improved construction wherein the liquid is caused to flow in a controlled path across the perforated plate.

Various other objects and advantages will be apparent as the nature of the invention is more fully disclosed.

In accordance with the present invention the perforated plate and baffle grid assembly of each stage is set in a well comprising side dams which prevent the liquid from by-passing the plates. A distributing weir extends across one end of the plate and is arranged to provide a uniform liquid distribution across the plate, and to form a liquid seal. The baffle grids extend along the plates in the direction of liquid flow to provide guiding vanes which direct the liquid over the plates. A liquid drain extends across the opposite end of the plate to distribute the liquid to the next lower treating zone and to provide a liquid seal which prevents the gas from by-passing the liquid.

In an apparatus of this type it has been found that a certain liquid head is required to cause the liquid to flow across the plates, thereby producing a liquid layer of constantly decreasing thickness from the distributing weir to the discharge end of the plate. In accordance with the present invention this difficulty is eliminated by mounting the plates on an inclined position, the inclination corresponding to the liquid head required for producing the liquid flow across the plate. The plate accordingly extends parallel to the surface of the liquid so that a liquid blanket of uniform thickness is maintained across the entire plate. In this way a uniform gas distribution through all of the orifices is likewise obtained as all of the gas is caused to pass through a liquid layer of the same thickness. The gas-liquid contact may accordingly be controlled as desired to produce efficient operation.

Although the novel features which are characteristic of this invention are pointed out more particularly in the claims, the nature of the invention will be better understood by referring to the following description taken in connection with the accompanying drawings in which a specific embodiment has been set forth for purposes of illustration.

In the drawings:

Fig. 1 is a side elevation on a small scale of a gas-liquid contact apparatus embodying the present invention;

Fig. 2 is a vertical section taken on the line 2—2 of Fig. 1, but on a larger scale;

Fig. 3 is a transverse section taken on the line 3—3 of Fig. 2; and

Figs. 4 and 5 are detail views showing the construction of the perforated plates and baffle grids.

In the drawings, Fig. 1 illustrates the invention as applied to a gas scrubber comprising an upright cylindrical housing or casing 10. The casing 10 is provided at its lower end with a gas inlet port 11 and at its upper end with a gas outlet port 12. Liquid is supplied through an inlet pipe 13 and is removed through a bottom drain 14. The scrubber includes a plurality of treating zones 15, two of which are shown in Fig. 2, and a drying zone 17. The lower end of the scrubber may include the usual spray zone not shown. A scrubber of this general type is shown in the Harmon Patent No. 2,319,814 dated May 25, 1943 and only so much thereof is disclosed herein as is necessary for an understanding of the present invention.

The upper treating zone 15 comprises a rectangular perforated plate 20 having a plurality of perforations or orifices 21 therein and a plurality of baffle grid bars 22 having vertical longitudinal flanges 23 and lower horizontal baffles 24 which are disposed over the respective orifices 21. The baffle grid bars 22 are secured to transverse spacing wires 25 by means of which they are spaced above the perforated plate 20 with the horizontal baffles 24 the proper distance above the perforations. The wires 25 at the two ends of the bars 22 are provided with a plurality of marginal ears 26 which overlie the peripheral edges of the perforated plate 20.

Segmental end plates 30 and 32 and side plates 31 and 33 are secured to the casing 10 by suitable means as by welding and define a rectangular central opening in which the perforated plate 20 and baffle grid bars 22 are mounted. In the embodiment shown the marginal edges of the plate 20 and the supporting ears 26 of the baffle grid assembly extend beneath the inner marginal edges of the segmental plates 30, 31, 32 and 33 and are secured thereto by suitable means shown as screws 34. It is to be understood of course that other securing means may be provided such as the wedge securing means shown in Harmon application Serial No. 648,797 filed February 19, 1946, Patent No. 2,420,242, dated May 6, 1947.

The side plates 31 and 33 are inclined downwardly between the end plates 30 and 32 and the perforated plate 20 is mounted in a correspondingly inclined position. Vertical dams 40 and 41 extend along the inner edges of the side plates 31 and 33 with their ends secured to the casing 10 to seal off the area of the plates 31 and 33 and to confine the liquid to the area of the perforated plate 20. A weir 43 extends across the inner edge of the segmental end plate 30 between the vertical dams 40 and 41 to control the flow of liquid across the perforated plate 20 and to maintain a predetermined depth of liquid on the plate 30. Liquid is supplied to the plate 30 through the pipe 13, the inner end of which is provided with an elbow 44 opening downwardly. A splash shield comprising a vertical wall 45 and a top wall 46 is secured to the casing 10 between the dams 40 and 41 to enclose the end of the pipe 13. The lower ends of the wall 45 extend into the liquid on the plate 30 to form a liquid seal.

The segmental end plate 32 is provided with an arcuate slot 49 registering with a downwardly extending arcuate wall 50 which forms a drain duct 51. The ends of the wall 50 are secured to the casing 10 by suitable means such as welding. The drain duct 51 distributes the liquid to the next lower treating zone 15, the elements of which correspond to the elements of the above described treating zone and have been given the same reference characters with the suffix "a" and the description thereof will not be repeated. The wall 50 extends below the level of the liquid maintained on the end plate 30a by the weir 43a to form a liquid seal. The perforated plate 20a slopes downwardly between the segmental end plates 30a and 32a, the slope being in the opposite direction from that of the plate 20 as viewed in Fig. 2.

It will be noted that the baffle grids 22 are mounted so that their vertical flanges 23 extend parallel to the path of liquid flow across the plate 20. The vertical flanges thus serve to guide and direct the liquid and cause the same to flow uniformly across the surface of the plate 20.

The treating zones may be repeated, the liquid flowing from one zone to the next until the lower zone of the scrubber is reached and the gas rising through the water blanket in the successive zones. Suitable manholes 60 closed by covers 61 are provided at the various treating zones so as to provide access thereto for cleaning.

It is to be understood of course that the lower zone may include a spray for wetting the incoming gases and removing the coarser particles therefrom. Likewise the top zone of the scrubber may include centrifugal driers 62 which cause the gases to whirl therein and centrifugally remove any droplets of liquid which may be carried along therewith.

Operation

In the operation of this device, the gas to be treated is supplied to the inlet port 11 and the liquid is supplied to the pipe 13 as above described. The liquid forms a layer on the end plate 30 to the depth of the weir 43 and overflows the weir to the perforated plate 20. The gas rising through the perforations 21 in the plate 20 prevents the liquid from flowing downwardly through these perforations. The liquid accordingly flows across the plate 20 and downwardly through the drain duct 51 to the next treating zone. The slope of the plate 20 is designed to correspond to the liquid head required to move the liquid across this plate. Consequently a blanket of liquid of uniform thickness is maintained across the entire plate and the gas is likewise uniformly distributed through the various orifices 21.

By reason of the dams 40 and 41 which confine the liquid to the area of the perforated plates, all of the liquid is caused to flow over the perforated plates. Likewise all of the gas is caused to flow through the orifices 21 and through the blanket of liquid on the plate 20. A gas-liquid seal is provided in the liquid inlet to each plate so that all of the gas is caused to flow upwardly through the liquid layer on the perforated plates.

The above described device thus provides for a uniform treatment with maximum gas-liquid contact at each zone and is suited to large commercial installations. Although certain specific embodiments of the invention have been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. A gas and liquid contact apparatus comprising a casing having a treating zone therein, said zone comprising a transverse partition including a flat plate containing perforations for the passage of gas flowing through said casing, a distributing weir extending across one end of said plate, means supplying liquid to flow over said weir onto said plate, a drain duct extending across the other end of said plate to receive the liquid after flowing over said plate, said plate being inclined downwardly between said weir and said drain duct by an amount corresponding to the liquid head required to cause the liquid to flow along said plate, whereby the liquid is maintained at a uniform depth on all parts of said plate, a baffle grid assembly comprising bars extending along said plate in the direction of liquid flow from said weir to said duct, said bars having vertical flanges to direct the liquid flow and horizontal baffles overlying said perforations.

2. A gas and liquid contact apparatus comprising a casing having a treating zone therein, said zone comprising a transverse partition including a flat plate containing perforations for the passage of gas flowing through said casing, a distributing weir extending across one end of said plate, means supplying liquid to flow over said weir onto said plate, a drain duct extending across the other end of said plate to receive the liquid after flowing over said plate, said plate being inclined downwardly between said weir and said drain duct by an amount corresponding to the liquid head require to cause the liquid to flow along said plate, whereby the liquid is maintained at a uniform depth on all parts of said plate, a baffle grid assembly comprising bars extending along said plate in the direction of liquid flow from said weir to said duct, said bars having vertical flanges to direct the liquid flow and horizontal baffles overlying said perforations, and vertical side walls extending along the sides of said plate to confine the liquid to the plate area.

ROBERT KOPITA.

REFERENCES CITED

The following references are of record in the file of this patent:

UNITED STATES PATENTS

| Number | Name | Date |
|---|---|---|
| 1,893,906 | Premore et al. | Jan. 10, 1933 |
| 1,973,141 | Clarke | Sept. 11, 1934 |
| 2,005,316 | Hall | June 18, 1935 |
| 2,420,242 | Harmon | May 6, 1947 |